United States Patent [19]

Hirai et al.

[11] 4,331,005
[45] May 25, 1982

[54] CONSTANT VELOCITY UNIVERSAL JOINT

[75] Inventors: Seiichi Hirai, Sayama; Nobuyuki Otsuka, Kawagoe, both of Japan

[73] Assignee: Honda Giken Kogyo Kabushiki Kaisha, Tokyo, Japan

[21] Appl. No.: 116,390

[22] Filed: Jan. 29, 1980

[30] Foreign Application Priority Data

Jan. 31, 1979 [JP] Japan ............................ 54-9946[U]

[51] Int. Cl.³ .............................................. F16D 3/30
[52] U.S. Cl. ..................................... 464/145; 464/906
[58] Field of Search ................................... 64/21, 7, 8

[56] References Cited

U.S. PATENT DOCUMENTS

| 1,975,758 | 10/1934 | Stuber | 64/21 |
| 2,046,584 | 7/1936 | Rzeppa | 64/21 |
| 2,319,100 | 5/1943 | Anderson | 64/21 |
| 4,180,344 | 12/1979 | Otsuka | 64/21 |
| 4,188,803 | 2/1980 | Otsuka | 64/21 |
| 4,231,232 | 11/1980 | Otsuka | 64/21 |

Primary Examiner—Charles J. Myhre
Assistant Examiner—Carl Stuart Miller
Attorney, Agent, or Firm—Posnack, Roberts, Cohen & Spiecens

[57] ABSTRACT

A constant velocity universal joint in which an outer member and an inner member are coupled through a cage member which has an outer spherical surface and an inner spherical surface. These spherical surfaces of the cage member are in contact with an inner spherical surface of the outer member and an outer spherical surface of the inner member, respectively. The cage member supports a number of balls in respective windows, and these balls are in engagement with respective pairs of longitudinally extending ball grooves formed in the inner spherical surface of the outer member and the outer spherical surface of the inner member. The bottom surfaces of the ball grooves extend substantially along respective circular arcs whose centers are located at equal distances on opposite sides of the center of the joint. The inner and outer spherical surfaces of the cage member are eccentric to one another and their centers are also located at equal distances on opposite sides of the center of the joint. The offset centers of the circular arcs and the offset centers of the spherical surfaces of the cage member are respectively coincident.

10 Claims, 4 Drawing Figures

CONSTANT VELOCITY UNIVERSAL JOINT

BACKGROUND OF THE INVENTION (a) Field of the Invention

The present invention relates to an improvements in constant velocity universal joints used in motor vehicles.

(b) Prior Art

In joints of conventional construction, an outer member and an inner member are coupled through a cage member having inner and outer spherical surfaces which are respectively in contact with an outer spherical surface of the inner member and an inner spherical surface of the outer member. The cage member supports a number of balls mounted in respective windows, and these balls engage in respective pairs of ball grooves formed in the inner and outer spherical surfaces of the outer and inner members respectively.

To give the joint a constant velocity characteristic, the respective ball grooves are formed so that they are offset, i.e. respective bottom surfaces of the groove extend substantially along circular arcs whose centers are offset from one another at equal distances on opposite sides of the center of the joint.

SUMMARY OF THE INVENTION

The conventional construction, as known in the art, possesses various disadvantages, and accordingly it is an object of the present invention to provide a universal joint which is substantially simple in construction and may be economically fabricated.

A further object of the present invention is to provide a universal joint which may be readily maintained in service and which has a substantially long operating life.

The objects of the present invention are achieved by forming the inner and outer spherical surfaces of the cage member with offset centers located on opposite sides of the center of the joint and forming the bottom surfaces of the grooves in the inner and outer members as circular arcs whose centers are also located on opposite sides of the center of the joint.

Preferably, the centers of the inner and outer spherical surfaces are equally spaced on opposite sides of the center of the joint. Also, it is preferred that the centers of the bottom surfaces of the grooves be equally spaced on opposite sides of the center of the joint.

In a particularly advantageous arrangement, the offset centers of the spherical surfaces of the cage member are coincident with the offset centers of the bottom surfaces of the grooves.

DESCRIPTION OF THE PREFERRED EMBODIMENTS

This invention relates to a constant velocity universal joint used chiefly for a vehicle, such as a motorcar or the like.

Figure 1:
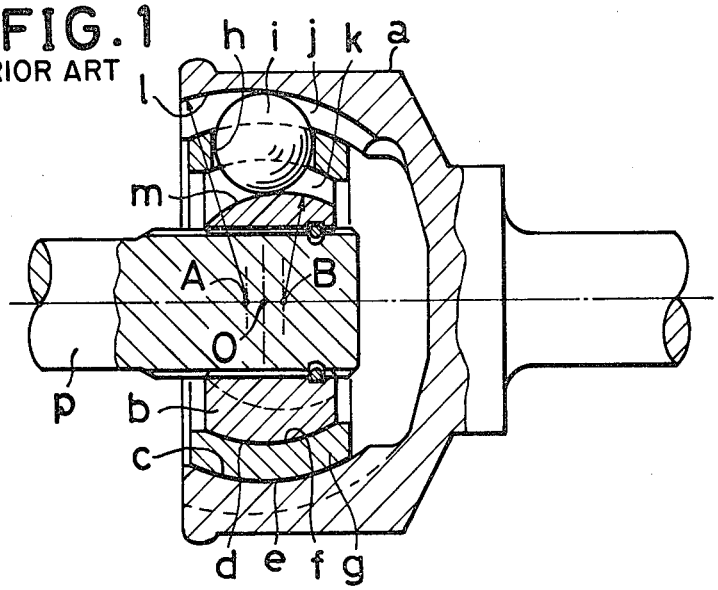
FIG. 1 is a sectional side view of a conventional universal joint in straight.

In a known joint of this type as shown in FIG. 1, an outer member a and an inner member b are coupled to one another through a cage member g having an outer spherical surface e and an inner diameter spherical surface f which are in spherical surface contact with an inner spherical surface c of the outer member a and an outer spherical surface d of the inner member b, respectively. The cage member g supports a plurality of balls i in respective ball windows h, and the respective balls i are in engagement with respective pairs of ball grooves j, k formed in the inner spherical surface c and the outer spherical surface d, respectively. In order to provide the joint with a constant velocity property, the respective ball grooves j, k are formed with respective bottom surfaces which extend along respective circular arcs 1, m whose centers are located at respective points A and B which are substantially equal is spaced on opposite sides of the center 0 of the joint.

It has been usual also with this conventional joint that the outer spherical surface e and the inner spherical surface f of the cage member g have coincident centers located at the joint center 0.

Figure 2:
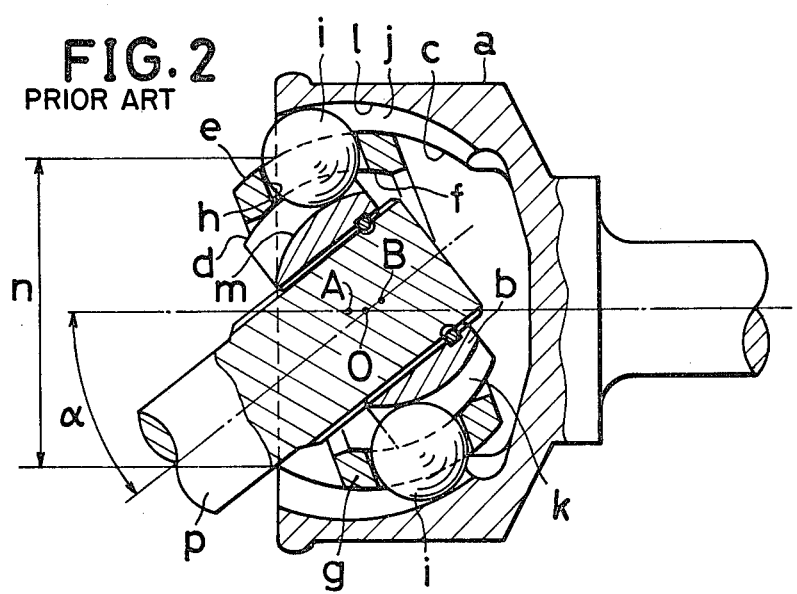
FIG. 2 is a sectional side view of the joint in FIG. 1 in a bent condition.
Figure 3:
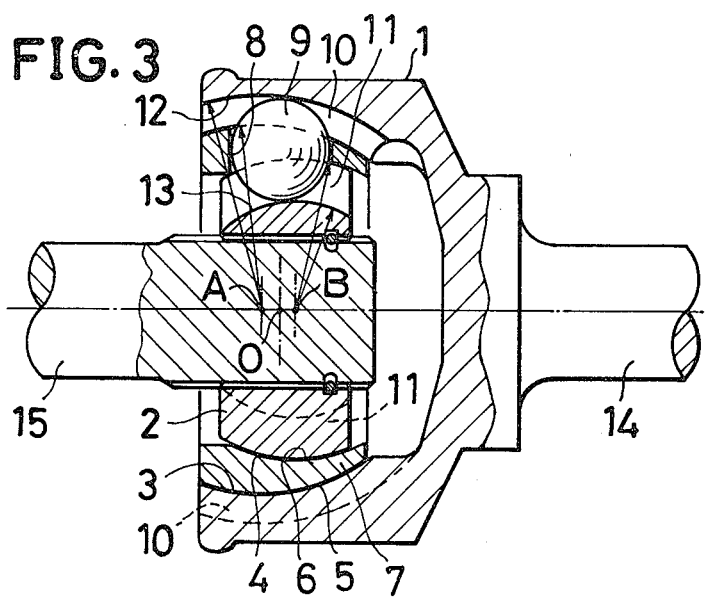
FIG. 3 is a sectional side view of the universal joint of one embodiment of this invention in straight condition.
Figure 4:
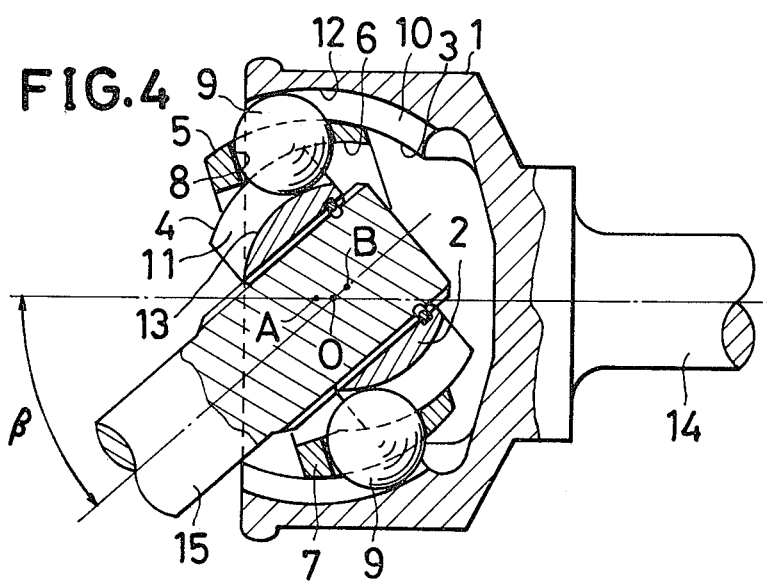
FIG. 4 is a sectional side view of the joint in FIG. 3 in a bent condition.

This conventional universal joint, however, has several disadvantages. Namely, as is clear from FIG. 1, the ball groove j in the outer member a becomes gradually shallower towards the base end of the groove, so that when the two members a, b are bent relative to one another as shown in FIG. 2, for instance, the ball i on the lower side in FIG. 2 is moved in this groove j towards the shallower side at the right end of the groove and is liable to come out of the groove. Additionally, as the two members a, b are bent relative to one another, the outer and inner spherical surfaces e, f of the cage member g and the groove bottom surfaces of the respective ball grooves j, k gradually undergo a change in spacing, so that each ball i is radially moved in the ball window h inwardly and outwardly. The peripheral edge surface of each window h is thereby subject to wear and there is generated noise. Additionally, the center of the inner surface c of the outer member a is located at the joint center 0, so that the diameter n of the mouth of the outer member a becomes comparatively small, and consequently when the inner member b is bent in relation to the member a, an inner shaft p extending from the inner member b can strike against the edge of the mouth as shown in FIG. 2. The bending angle α is thereby, comparatively small and, in the case of a motorcar, for instance, manual steering becomes poor and the turning radius of the car becomes large.

This invention has for its object to provide a joint free from the above disadvantages, and comprises an outer member 1 and an inner member 2 coupled to one another through a cage member 7 having an outer spherical surface 5 and an inner spherical surface 6 which are in spherical surface contact with an inner spherical surface 3 of the outer member 1 and an outer spherical surface 4 of the inner member 2, respectively. The cage member 7 is provided with ball windows 8 and a plurality of balls 9 are mounted in respective ball windows 8 and are in engagement in respective pairs of longitudinally extending ball grooves 10, 11 formed in the inner spherical surface 3 and the outer diameter spherical surface 4. Additionally, the respective ball grooves 10, 11 have bottom surfaces which extend substantially along on respective circular arcs 12, 13 centers are located at points A and B which are equally spaced on opposite sides of the center 0 of the joint. The outer spherical surface 5 and the inner spherical surface 6 of cage member 7 have respective centers are located at or near the points A and B. The spherical surfaces 5 and 6 have centers coincident with respective spherical surfaces 3 and 4.

Rotary shafts 14 and 15 extend from the respective members 1, 2 and provide a constant velocity power transmission therebetween as described below.

In operation of the joint of this invention if one of the two members 1, 2 is driven in rotation by the respective rotary shaft, the other member is rotated therewith and there is effected a power transmission between the two members 1, 2. In this case, since the bottoms of each pair of ball grooves 10, 11 extend substantially along the respective circular arcs 12, 13 which are eccentric to each other, there can be obtained the power transmission of constant velocity. Additionally, due to the eccentricity of the inner and outer spherical of the cage member 7, there can be also obtained power transmission of constant velocity.

Thus, by a combination of constructional features, there can be obtained good constant velocity power transmission between the two members 1, 2. Additionally, in this case, since the bottom of the groove surfaces 12, 13 extend along circular arcs which are substantially concentric, respectively, with the inner spherical surface 3 and the outer spherical surface 4 of the two members 1, 2, the respective ball grooves 10, 11 become substantially equal in groove depth throughout the entire length thereof. Thereby, the foregoing disadvantages in the conventional construction in which each groove becomes gradually shallower is avoided. Additionally, as the two members 1, 2 are bent relative to one another, each ball 9 is prevented from moving radially inwardly and outwardly in each ball window 8, so that this disadvantage in the conventional construction is eliminated.

Additionally, since the center of the inner diameter spherical surface 3 of the outer member 1 is located at or near the point A which is off set to one side from the joint center 0, the mouth of outer member 1 can be made comparatively large in diameter, and thereby there can be obtained a comparatively large bending angle β between the two shafts 14, 15. The disadvantage in the conventional construction in which the mouth is comparatively small in diameter, can be thereby be avoided.

Thus, according to this invention, not only are the bottoms of the ball grooves 10, 11 eccentric to one another, but the inner and outer spherical surfaces 5, 6 of cage member 7 are eccentric to one another. Therefore, by the two offset constructions, there can be obtained, as a whole, a joint with excellent constant velocity property, and also there can be removed various disadvantages present in the conventional construction with only the single offset construction of the bottoms of the grooves.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A constant velocity universal joint comprising an outer member having an inner spherical surface, an inner member fitted in said outer member and having an outer spherical surface facing said inner spherical surface of the outer member, said inner and outer members being adapted for relative angular travel about a center of the joint, a cage interposed between said inner and outer members, said cage having an outer spherical surface in contact with the inner spherical surface of the outer member and an inner spherical surface in contact with the outer spherical surface of the inner member, said cage having windows therein, and balls disposed in said windows and projecting outwardly therefrom, said inner and outer members being provided with respective opposed ball grooves in which said balls are engaged and are adapted to travel when the inner and outer members undergo relative angular movement, said ball grooves having respective bottom surfaces in said inner and outer members, said bottom surfaces in the inner and outer members extending along arcs which have respective centers offset on opposite sides of the center of the joint, said inner and outer spherical surfaces of said cage and the respective contact surfaces of said inner and outer members having respective centers also offset on opposite sides of said center of the joint, the combination of (1) the offset of the centers of the bottom surfaces of the grooves in the inner and outer members and (2) the offset of the centers of the inner and outer spherical surfaces of the cage being such that the balls remain engaged over the full depth of said grooves for substantially the entire extent of relative angular travel of said inner and outer members without undergoing substantial radial shifting in the windows of said cage.

2. A universal joint as claimed in claim 1 wherein the relation between the offset of said centers of said bottom surfaces of the ball grooves and of the centers of said spherical surfaces of said cage is such to provide substantially equal groove depths in said inner and outer members over substantially the entire length of said ball grooves and substantially constant radial position of said windows in the cage relative to the bottom surfaces of the ball grooves for substantially the entire extent of relative angular travel of said inner and outer members.

3. A universal joint as claimed in claim 1 wherein said centers of the bottom surfaces of the ball grooves in the inner and outer members are located at equal distances on opposite sides of said center of the joint.

4. A universal joint as claimed in claim 1 wherein said center of the bottom surfaces of the grooves in the outer member and the center of the outer spherical surface of the cage are coincident and the center of the bottom surfaces of the grooves in the inner member and the center of the inner spherical surface of the cage are coincident.

5. A universal joint as claimed in claim 4 wherein said two coincident centers are located on opposite sides of said center of the joint.

6. A universal joint as claimed in claim 5 wherein said two coincident centers are equally spaced on opposite sides of said center of the joint.

7. A universal joint as claimed in claim 6 wherein said outer member has an open mouth, said center of said inner spherical surface of said outer member being located on the side of the center of the joint closer to said open mouth.

8. In a constant velocity universal joint comprising an outer member having an inner spherical surface, an inner member fitted in said outer member and having an outer spherical surface facing said inner spherical surface of the outer member, said inner and outer members being adapted for relative angular travel about a center of the joint, a cage interposed between said inner and outer members, said cage having an outer spherical surface in contact with the inner spherical surface of the outer member and an inner spherical surface in contact with the outer spherical surface of the inner member, said cage having windows therein, and balls disposed in said windows and projecting outwardly therefrom, said inner and outer members being provided with respective opposed ball grooves in which said balls are engaged and are adapted to travel when the inner and outer members undergo relative angular movement, said ball grooves having respective bottom surfaces in said inner and outer members, said bottom surfaces in the inner and outer members extending along arcs which have respective centers, the improvement wherein the center of the bottom surfaces of the grooves in the outer member and the center of the outer spherical surface of the cage are coincident and located on one side of the center of the joint and the center of the bottom surfaces of the grooves in the inner member and the center of the inner spherical surface of the cage are coincident and located on the other side of the center of the joint.

9. The improvement as claimed in claim 8 wherein said two coincident centers are equally spaced on the opposite sides of said center of the joint.

10. A universal joint as claimed in claim 9 wherein said outer member has an open mouth, said center of said inner spherical surface of said outer member being located on the side of the center of the joint closer to said open mouth.

* * * * *